(12) United States Patent
Nicolai et al.

(10) Patent No.: US 6,820,720 B1
(45) Date of Patent: Nov. 23, 2004

(54) SOUND-ABSORBING ARTICLE EFFECTIVE OVER A BROAD FREQUENCY RANGE

(75) Inventors: Norbert Nicolai, Schermbeck (DE); Helmut V. Fuchs, Weil im Schonbach (DE); Dinh-Quyen Chuong, Dortmund (DE)

(73) Assignee: Clion Irland Ltd., Waterford (IE)

( * ) Notice: Subject to any disclaimer, the term of this patent is extended or adjusted under 35 U.S.C. 154(b) by 0 days.

(21) Appl. No.: 10/049,344

(22) PCT Filed: Aug. 20, 2000

(86) PCT No.: PCT/EP00/07459
§ 371 (c)(1),
(2), (4) Date: Feb. 11, 2002

(87) PCT Pub. No.: WO01/12470
PCT Pub. Date: Feb. 22, 2001

(30) Foreign Application Priority Data

Aug. 11, 1999 (DE) .......................... 199 38 005
May 11, 2000 (DE) .......................... 100 22 902

(51) Int. Cl.⁷ .............................................. G10K 11/16
(52) U.S. Cl. ...................................... 181/292; 181/293
(58) Field of Search ................................. 181/292, 293

(56) References Cited

U.S. PATENT DOCUMENTS 5,670,235 A * 9/1997 Stricker et al. ............. 428/138
5,700,527 A * 12/1997 Fuchs et al. ................ 428/34.4
5,750,944 A 5/1998 Fuchs

FOREIGN PATENT DOCUMENTS

| DE | 3018072 A | 5/1980 |
|---|---|---|
| DE | 3729765 A | 9/1987 |
| DE | 4119783 A | 6/1991 |
| DE | 4123593 A | 7/1991 |
| DE | 4137706 A1 | 5/1993 |
| DE | 19613875 A | 4/1996 |
| DE | 19615917 A | 4/1996 |
| DE | 19754107 C1 | 12/1997 |
| DE | 29710491 U1 | 4/1998 |
| DE | 19730355 C1 | 3/1999 |
| WO | WO 94/24382 | 10/1994 |
| WO | WO 97/27370 | 7/1997 |
| WO | WO 00/05707 | 2/2000 |

\* cited by examiner

Primary Examiner—Marlon T. Fletcher
Assistant Examiner—David S. Warren
(74) Attorney, Agent, or Firm—Venable LLP; Thomas G. Wiseman

(57) ABSTRACT

A sound-absorbing article which is one of a lining or a shaped element and which has a sound absorptive effect over a broad frequency range particularly useful in transportation vehicle when positioned proximate a reverberant wall, the article including at least one microperforated sheet absorber which has microperforations defined therein having at least one hole diameter ranging from 0.05 mm to 2 mm, which has at least one interhole distance ranging from 1 mm to 20 mm, and which has a proportion of hole area ranging from 0.2 to 4%, based on surface area of the at least one microperforated sheet absorber; and at least one absorber which is at least one of a foam absorber and a non-woven absorber and which is positioned at a preselected spatial distance from a reverberant wall.

16 Claims, 3 Drawing Sheets a)

b)

c)

SOUND-ABSORBING ARTICLE EFFECTIVE OVER A BROAD FREQUENCY RANGE

BACKGROUND OF THE INVENTION

1. Field of the Invention

The present invention relates to a lining or shape element for means of transportation. In the prior art, absorbers made of fibrous materials are known which are employed as non-woven components, In addition to natural fibers, polymeric fibers, inorganic or metallic fibers may be employed as said fibers. Bonding to the components is effected by bonding through intrinsic as well as extrinsic fibers and/or through a binder which may be of polymeric or even inorganic nature.

2. Description of the Related Art

Further, absorbers made of open-pore foams of a polymeric, organic as well as inorganic material are known. The optimum absorption effect of such materials is within a frequency range of from 2000 to 10,000 Hz.

From the various fields of technology, the use of Helmholtz resonators having a wide variety of dimensions is known for the damping of air-borne sound; in the field of motor vehicle construction, reference may be made representatively to the German Offenlegungsschriften DE 196 15 917 A, DE 196 13 875 A and DE 37 29 765 A. These absorbers are very space-intensive and only conditionally suitable for motor vehicle construction.

DE 197 54 107 C1 and the prior art references cited therein, the full disclosure of which is included herein by reference, examine the absorptive behavior of microperforated components. The document mentioned examines baffle structures built of layers of microperforated plastic sheets pending from a ceiling or a roof as so-called compact absorbers. The microperforated plastic sheets are suitable for absorbing very effectively on one side or both sides thereof sound waves impinging from the space in a perpendicular, oblique or glancing direction, especially at higher frequencies.

If additionally, for every microperforated sheet, a further non-perforated sheet is spanned in parallel at a distance of some centimeters, the absorption of the acoustically active sheet is not improved. This is explained by the fact that the latter sheet needs neither a reverberant back wall nor a gap of any shape as an air cushion in between for displaying its damping activity. In contrast, if the microperforated sheets are replaced by non-perforated sheets of the same material, only a very low absorption remains. It is well-known that sound absorption arises for a resonator arrangement where a mass-spring effect can occur. A physical explanation for the sound absorption of the microperforated sheets is not considered possible by the inventors of the mentioned document.

Further, there are known microperforated sheets and plates which can filter out defined frequencies as a function of the pore diameter, the distance of the sheet from the wall, the surface area which is open due to the bores and the sheet thickness. DE 197 54 107 A describes such a sound absorber for the field of rooms. Here, the effect is seen that a high absorption can be achieved only over a relatively narrow frequency range. A broadening of the absorption range is always connected with a considerable loss of absorption and finally gets completely ineffective.

In a two-layer arrangement in which two sheets are arranged behind one another, two frequency ranges can be absorbed. Thus, a broadening is possible without reaching the broadness necessary in the automobile field.

Further, there are known structures where a sound-impermeable plastic sheet is provided with perforations in order to achieve an absorptive effect from the underlying absorber, see for example DE 30 18 072 A, DE 41 23 593 A.

DE 41 19 783 A describes a sound-absorbing element which consists of two perforated plates provided on top of one another, arranged at a distance from the substrate element and from each other. Between the two perforated plates, there is a foam plate. The perforated proportion of the sound-facing side is 50%, and that of the side facing away from the sound is 20% and thus clearly above the values considered necessary here.

It has been the object of the invention to provide an absorber which has an absorptive effect throughout the range of frequencies interesting to the automobile industry (from 500 Hz to 5000 Hz) and does not need much building space.

SUMMARY OF THE INVENTION

According to the invention, this object is achieved by providing a layered structure of microperforated absorbers and a non-woven material and/or foam absorber and/or air gap in such a way that a non-woven material and/or foam absorber and/or air gap alternates with a microperforated plate/sheet (microperforated sheet absorber). Preferably, the absorbers have such a structure that one or two microperforated plates/sheets are stacked in connection with two or three non-woven and/or foam absorbers or one or two gaps.

Due to the perforated design of the microperforated absorbers and the thickness of the non-woven and/or foam absorbers and/or air-gaps, a coupling of the two kinds of absorbers is achieved. When the coupling of the individual absorber types is considered, a distinction must be made in terms of which type is provided on the surface in the direction of sound entry.

If a non-woven and/or foam absorber and/or air gap is positioned on the sound, facing side, the properties of the composite (microperforated plate/sheet—non-woven and/or foam absorber and/or air gap) are determined by the non-woven and/or foam absorber alone from a defined thickness. Depending on the kind of non-woven and/or foam absorber and/or air gap employed, this thickness is from 20 to 40 mm.

With decreasing thickness (from 40 mm to 0.3 mm) of the non-woven and/or foam absorber and/or air gap, the microperforated absorber increasingly contributes to the effect. By selecting the thickness of the non-woven and/or foam absorber and/or air gap, the effects of the two absorbers can be matched to one another. The same applies to a subsequent ply of microperforated absorber and non-woven and/or foam absorber and/or air gap for multilayered absorbers.

If the microperforated sheet absorber is positioned on the sound-facing side, coupling of the two types of absorbers can be effected primarily through the open surface area. With increasing open surface area, the absorption behavior is increasingly determined by the non-woven and/or foam absorber and/or air gap. For an open surface area of about 40%, the non-woven and/or foam absorber and/or air gap reaches its full activity without the microperforated absorber completely losing its activity.

According to the invention, one or more microperforated sheet absorbers are layered with an open surface area of preferably up to 4%. On the surface on the sound-facing side and/or between the plates or between the wall and the last microperforated sheet resonator, there is a foam and/or non-woven absorber or air.

The absorption behavior of the absorber which represents the surface of the sound-facing side dominates the absorption behavior of the overall system.

Therefore, in the case where a foam and/or non-woven absorber is positioned on the surface, of course, the thickness of the absorber also plays a role. When a foam and/or non-woven absorber as used in the automobile field is positioned in the first ply towards the sound impingement, the effect of a microperforated sheet absorber positioned in the second layer as seen from the sound source is reduced from a thickness of about 7 mm of the foam and/or non-woven absorber to such a high extent that its effect can hardly be detected any more. In this case, the property picture of the foam/non-woven absorber dominates.

On the other hand, when the microperforated sheet absorber is positioned on the surface of the sound-facing side, it will dominate the property picture of the overall system. In this case, the effect of the foam and/or non-woven absorber and/or air gap is decidedly low, and its use is of no practical importance.

When the microperforated sheet absorber is positioned before the foam and/or non-woven absorber and/or air gap as seen from the sound source, the inclusion of additional open surface areas in the microperforated sheet absorber results in a coupling of the microperforated sheet absorber and foam and/or non-woven absorber and/or air gap.

If the open surface area is increased solely by increasing the number of holes while the hole diameters remain equal, i.e. the interhole distance decreases, then the properties of the overall system will change to the extent to which the properties of the microperforated sheet absorber change, i.e., after a maximum is passed, the effect strongly decreases.

However, if the open surface in the microperforated sheet absorber is increased by including additional holes having a surface area of from 6 mm$^2$ to 40,000 mm$^2$ (macroperforation), which do not exhibit any absorption effect for the given structure of the microperforated sheet absorber alone (wall distance, sheet thickness, interhole distance), there will be coupling to the foam and/or non-woven absorber.

In contrast to expectations, no simple superposition of the two effects was seen in such terms that one effect increases and the other decreases. Rather, there is a shift in the maximum absorption into a different frequency range, or two separate absorption maximums can be formed.

It is important in this connection that the frequency range audible to the human ear can be covered by this coupling of the two absorbers, which can never be achieved by a microperforated sheet absorber or a foam/non-woven sheet absorber alone for the given wall distance (from 10 to 20 mm).

It is important in this connection that, for a medium concentration of the holes for the microperforation, the arrangement of the holes on the total surface of the component does not codetermine the absorption ratio, as represented in FIG. 3.

In FIGS. 3a) to c), the components have equal hole diameters and the same open surface area. For measurements in Kundt's tube, they yield almost the same absorption maximum at the same frequency.

On the one hand, this perforation can be utilized in a well-purposed manner for the design, especially in the areas which are in the visible region, for example, in the interior.

On the other hand, the areas of the microperforated sheet absorber which have only microperforation (no macroperforation) can be increased in surface area to obtain the same effect as if the macroperforation did not exist (high efficiency). Then, the macroperforation still yields the effect of the foam and/or non-woven absorber.

For the same open surface area, the effect of the microperforated sheet absorber is determined by the design of the open area. If an increase of the open area is achieved by an increase in the number of the microperforations, then the effect of the two absorber types is an optimum for each open surface area.

However, the preparation of such microperforated sheet absorbers is tedious so that an increase of the open surface area by increasing the holes up to a striate structure of the microperforated absorber and non-woven and/or foam absorber can also be employed simultaneously. The size of the open areas is within a range of from 6 to 40,000 mm$^2$.

To achieve a spatially homogeneous absorption, the contiguous open surface area must not exceed a value of 40,000 mm$^2$.

In the following, some typical structures as employed in the automobile field are represented.

The lining or shape elements according to the invention are suitable for replacing non-sound-absorbing lining or shape elements in the vehicle field as previously used in the prior art by sound-absorbing lining or shape elements. In addition, the present invention permits to design novel elements in the vehicle field which did not previously exist in the prior art.

Particularly preferred lining or shape elements according to the present invention include, for example, wheel housings, hoods, hood linings, engine encapsulations, heat transfer plates, vehicle shields, transmission tunnel linings, dashboards, vehicle seats, seat backs, armrests, steering wheels, carpetings, especially carpets, roof linings, pillar linings, door linings, passenger compartment linings, luggage shelves, rear shelves, heat shields and/or trunk linings.

DESCRIPTION OF THE PREFERRED EMBODIMENTS

Figure 1:
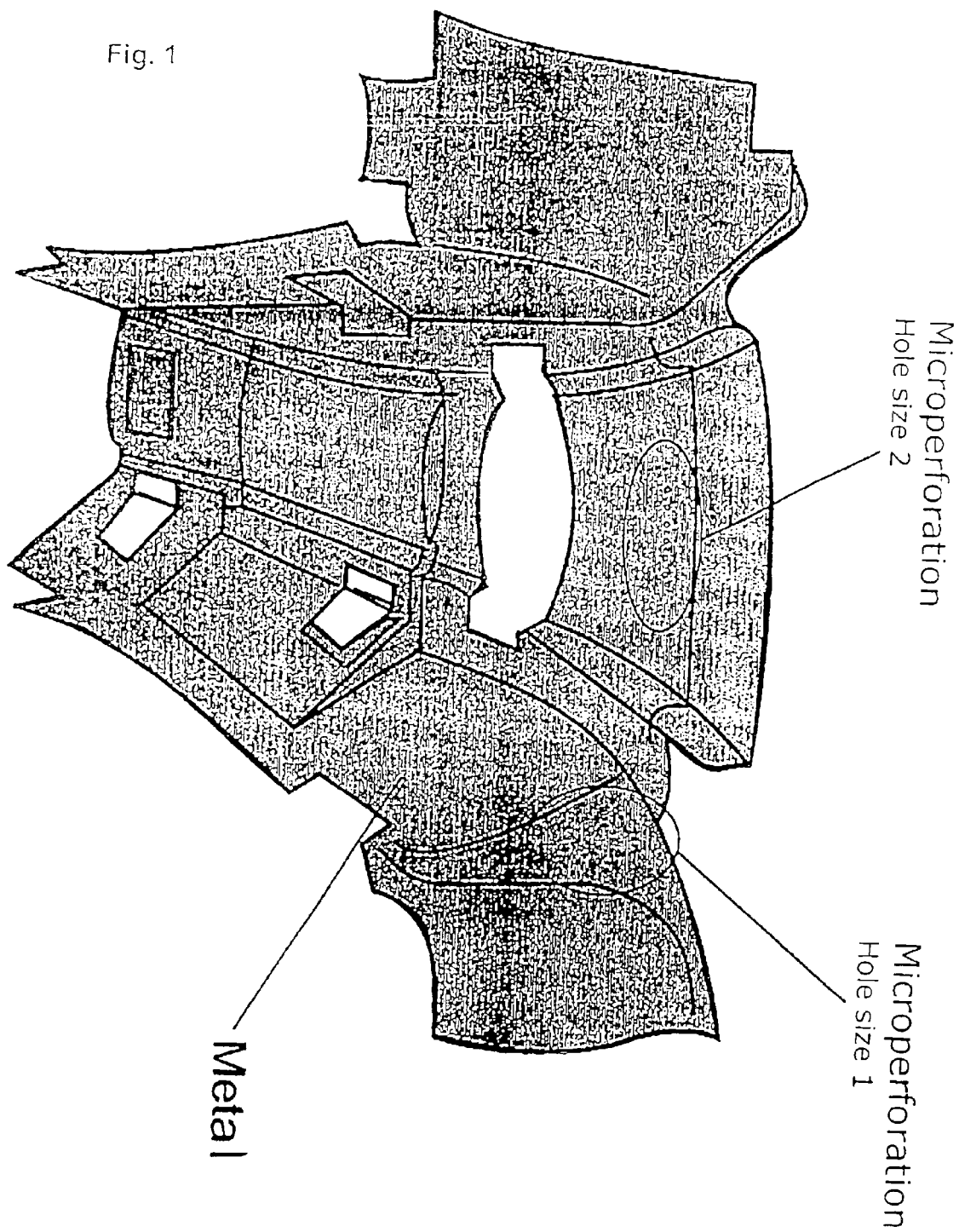
FIG. 1 shows a transmission tunnel lining which comprises different hole sizes in the microperforated sheet absorber according to the present invention.
Figure 2:
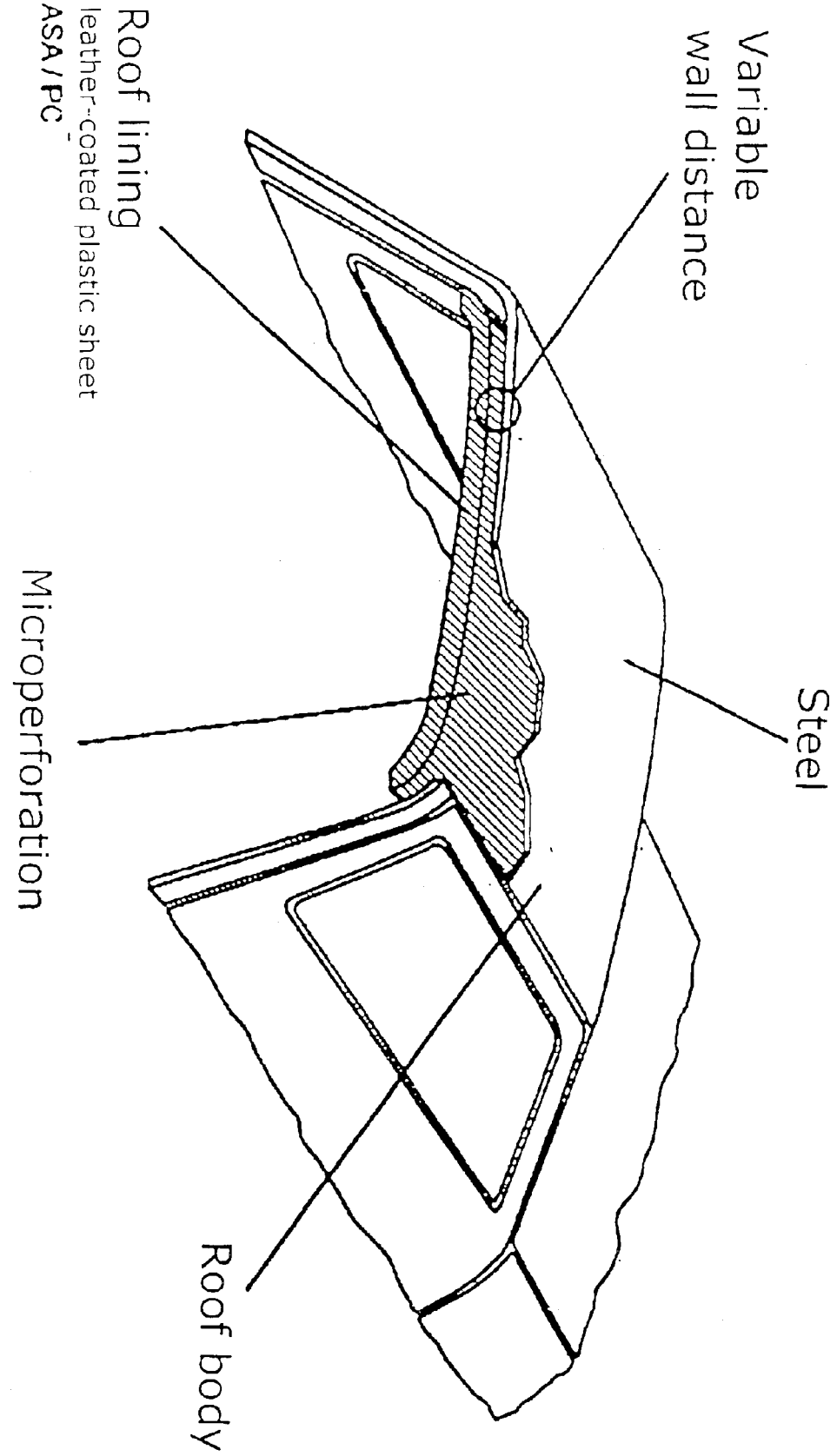
FIG. 2 shows a roof lining designed by means of the present invention.
Figure 3:
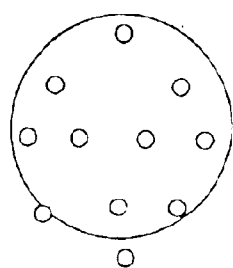
FIGS. 3(a), 3(b) and 3(c) each show components having equal hole diameters and the same open surface area as previously discussed.
Figure 3:
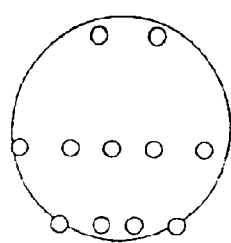
Figure 3:
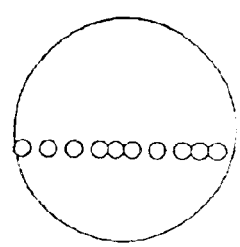

Thus, using the present invention, it is possible to provide lining or shape elements for means of transportation which not only have a microperforated sheet absorber at a distance from the reverberant wall, but in addition several microperforated sheet absorbers on top of one another, respectively arranged at a certain distance between them.

The sound-technological properties of the lining or shape elements in the vehicle field according to the invention are essentially determined by the number of microperforated sheet absorbers, the proportion of hole area, the interhole distances and the hole diameters.

Therefore, particularly preferred according to the present invention are lining or shape elements in the vehicle field which are characterized in that said microperforated sheet absorber has a proportion of hole area with microperforation of from 0.2 to 4%, especially from 0.3 to 2%, based on the surface area of the microperforated sheet absorber. Of course, it is possible to design them respectively with a different or the same proportion of hole area. The holes can be introduced into the microperforated sheet absorber with any desired geometry by methods per se known in the prior art, for example, by punching or laser irradiation.

If the proportion of hole area is chosen too low, a sound-absorbing effect does not exist, or not sufficiently so, while on the other hand, when the proportion of hole area is chosen too high, the sound-absorbing effect again decreases.

Preferably, the lining or shape elements in the vehicle field according to the invention comprise holes in a microperforated sheet absorber having one or more diameters within a range of from 0.05 mm to 2 mm, especially 0.01 mm to 0.8 mm, and one or more interhole distances in the sheet absorber within a range of from 1 mm to 3 mm, especially from 2 mm to 20 mm.

The hole sizes or interhole distances in a second or in further subsequent microperforated sheet absorbers are on the same scale as in the first microperforated sheet absorber, but are distinguished by their absolute size.

Thus, for example, it is possible to design all the usual components of the interior of vehicles, especially those arranged before hollow spaces, in the microperforated configuration. For example, by laser irradiation, irreversible holes can be produced in all known materials.

To be able to have a sound-absorbing effect, it is preferred according to the present invention to provide the holes with a larger diameter, for example, within a range of from 0.5 mm to 2 mm, in the more remote visible area, for example, in the roof lining or rear shelf in motor vehicles, or in the roof lining or hand luggage shelf in planes. In the near region, which is especially perceived optically, it is preferred according to the present invention to provide holes having a diameter of from 0.05 to 0.5 mm. With holes having diameters within a range of from 0.3 to 0.1 mm diameter, the viewer does no longer optically perceive the holes in the surface or takes them for a structure. Thus, for example, vehicle seats, seat backs, armrests, side parts of the seats, dashboard and side and door linings can have microperforated surfaces according to the present invention.

In the engine compartment, many parts are arranged before hollow spaces, wherein the hollow spaces need not be enclosed. The heat shields above the exhaust manifolds and other hot parts of the engine may also have a microperforated design. Also, it is possible to provide virtually the complete interior lining of the engine compartment, such as engine encapsulations or hood linings, with the microperforated design. When surfaces of the vehicle or engine are directly equipped according to the present invention, a particularly good sound absorption can possibly be achieved at the site of sound development.

It is well known that the mutual wall distance between the sheet absorbers affects the sound-absorption capability. In a preferred embodiment of the present invention, the mutual distance of the microperforated sheet absorbers is constant when more than 2 microperforated sheet absorbers are present. Thus, these are parallel, optionally plane-parallel, layers. Since plane-parallelity is usually undesirable in vehicle construction, in a further preferred embodiment of the present invention, the mutual distance of the microperforated sheet absorbers is varying when more than 2 microperforated sheet absorbers are present. Further, this is to be understood in such terms that, for example, curved, convex or concave layers having different radii of curvature are facing each other.

According to the present invention, it is not necessarily required that the space between the respective microperforated sheet absorbers is filled with a damping material. In the case where a damping material is present, the latter is more preferably selected from open-pore foams, especially of plastic or metal, and of a non-woven material. It is possible to fill the distance or the respective distances between the microperforated sheet absorbers in part or completely with the desired material.

Thus, using the present invention, it is possible to provide lining or shape elements for vehicles, especially motor vehicles, for example, passenger cars, trucks, busses, motor bikes, track-bound vehicles, especially locomotive engines, waggons and streetcars, and for vessels and airplanes.

What is claimed is:

1. A sound-absorbing article which is one of a lining or a shaped element and which has a sound absorptive effect over a broad frequency range when positioned proximate a reverberant wall, the sound-absorbing article comprising:

at least one microperformated sheet absorber which has microperforations defined therein having at least one hole diameter ranging from 0.05 mm to 2 mm, which has at least one interhole distance ranging from 1 mm to 20 mm, and which has a proportion of hole area ranging from 0.2 to 4%, based on surface area of the at least one microperforated sheet absorber; and at least one absorber which is at least one of a foam absorber and a non-woven absorber and which is positioned at a preselected spatial distance from a reverberant wall, wherein the sound-absorbing article is incorporated into a means for transportation as a composite article selected from the group consisting of wheel housing, hoods, hood linings, engine encapsulations, heat transfer plates, vehicle shields, transmission tunnel linings, dashboards, vehicle seats, seat backs, armrests, steering wheels, carpeting, roof linings, pillar linings, door linings, passenger compartment linings, luggage shelves, rear shelves, heat shields and trunk linings and wherein the microporated sheet absorber and the foam absorber or non-woven absorber cooperate to produce a sound absorptive effect over frequencies ranging at least from 500 Hz to 5000 Hz when positioned proximate a reverberant wall and wherein the open surface in the microperforated sheet absorber is increased by including additional holes having a surface area of from 6 mm$^2$ to 40.000 mm$^2$ (macro perforation).

2. The sound-absorbing article according to claim 1, wherein the at least one microperforated sheet absorber has a proportion of hole area ranging from 0.3 to 2%, based on the surface area of the at least one microperforated sheet absorber.

3. The sound-absorbing article according to claim 1, wherein the microperforations have at least one hole diameter ranging from 0.1 mm to 0.8 mm and at least one interhole distance ranging from 1 mm to 3 mm.

4. The sound-absorbing article according to claim 1, wherein a plurality of the at least one microperforated sheet absorber are included, each of the plurality having respectively different hole diameters and respectively different interhole distances.

5. The sound-absorbing article according to claim 1, wherein the at least one microperforated sheet absorber has a proportion of hole area ranging from 2 to 20%, based on surface area of the at least one microperforated sheet absorber.

6. The sound-absorbing article according to claim 1, wherein the microperforations have the same hole diameters, have the same open surface area, and have a distribution over the surface of the at least one microperforated sheet absorber which is one of (a) homogeneous or (b) concentrated on one of (1) one place or (2) several places of the at least one microperforated sheet absorber.

7. The sound-absorbing article according to claim 1, wherein the at least one microperforated sheet absorber has a thickness ranging from 0.2 mm to 5 mm.

8. The sound-absorbing article according to claim 1, wherein the at least one microperforated sheet absorber has a thickness ranging from 0.2 mm to 2 mm.

9. The sound-absorbing article according to claim 1, wherein the at least one microperforated sheet absorber comprises a material selected from the group consisting of plastics, leather, cork, wood, rubber, textiles, glass, and metals.

10. The sound-absorbing article according to claim 1, wherein the sound-absorbing article is a shaped element and has a plurality of layers, wherein the plurality of layers are comprised of a composition which is one of the same or different.

11. The sound-absorbing article according to claim 1, wherein at least three microperforated sheet absorbers are included and are positioned and maintained at a mutual distance from one another which is constant, respectively.

12. The sound-absorbing article according to claim 1, wherein at least three microperforated sheet absorbers are included and are positioned and maintained at a mutual distance from one another which differs, respectively.

13. The sound-absorbing article according to claim 1, wherein the sound-absorbing article is a shaped element and has a thickness, an interhole distance, and hole diameters which vary over the shaped element.

14. The sound-absorbing article according to claim 1, wherein the sound-absorbing article is incorporated into a means for transportation as a composite article, and wherein the means for transportation is selected from the group consisting of a motor vehicle, a track-bound vehicle, a vessel, and an airplane.

15. The sound-absorbing article according to claim 14, wherein the means for transportation is a motor vehicle and is one of a passenger car, a truck, a bus, and a motor bike.

16. The sound-absorbing article according to claim 14, wherein the means for transportation is a track-bound vehicle and is one of a locomotive engine, a wagon, and a streetcar.

* * * * *

UNITED STATES PATENT AND TRADEMARK OFFICE
CERTIFICATE OF CORRECTION

PATENT NO. : 6,820,720 B1
DATED : December 14, 2004
INVENTOR(S) : Nicolai et al.

It is certified that error appears in the above-identified patent and that said Letters Patent is hereby corrected as shown below:

<u>Title page,</u>
Item [22], PCT Filing date, please delete "Aug. 20, 2000" and insert therefore
-- Aug. 2, 2000 --.

Signed and Sealed this

Twenty-third Day of August, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,820,720 B1 |
| APPLICATION NO. | : 10/049344 |
| DATED | : December 14, 2004 |
| INVENTOR(S) | : Norbert Nicolai, Helmut V. Fuchs and Dinh-Quyen Chuong |

It is certified that error appears in the above-identified patent and that said Letters Patent is hereby corrected as shown below:

On the title page Item (22) PCT Filed: please correct the following:

line [22] please delete "Aug. 20, 2000"

and insert therefore --Aug. 2, 2000--

Signed and Sealed this

Fifth Day of February, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,820,720 B1 | Page 1 of 1 |
| APPLICATION NO. | : 10/049344 | |
| DATED | : November 23, 2004 | |
| INVENTOR(S) | : Norbert Nicolai, Helmut V. Fuchs and Dinh-Quyen Chuong | |

It is certified that error appears in the above-identified patent and that said Letters Patent is hereby corrected as shown below:

On the title page Item (22) PCT Filed: please correct the following:

line [22] please delete "Aug. 20, 2000"

and insert therefore --Aug. 2, 2000--

This certificate supersedes the Certificate of Correction issued February 5, 2008.

Signed and Sealed this

Twenty-sixth Day of February, 2008

JON W. DUDAS
*Director of the United States Patent and Trademark Office*